(12) United States Patent
Kurashige (10) Patent No.: US 7,015,977 B2
(45) Date of Patent: Mar. 21, 2006

(54) SPECIAL EFFECT IMAGE GENERATING APPARATUS EMPLOYING SELECTIVE LUMINANCE/CHROMINANCE CONDITION SETTING

(75) Inventor: Masafumi Kurashige, Kanagawa (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 09/842,933

(22) Filed: Apr. 26, 2001

(65) Prior Publication Data

US 2002/0008783 A1 Jan. 24, 2002

(30) Foreign Application Priority Data

Apr. 27, 2000 (JP) .................................... 2000-127500

(51) Int. Cl.
*H04N 9/74* (2006.01)

(52) U.S. Cl. ...................... 348/584; 348/592; 348/576
(58) Field of Classification Search ............... 348/584, 348/590, 592, 560, 599, 576, 577; 345/589–592
See application file for complete search history.

(56) References Cited

U.S. PATENT DOCUMENTS

| | | | | |
|---|---|---|---|---|
| 4,782,384 A | * | 11/1988 | Tucker et al. ............... | 348/577 |
| 5,010,407 A | * | 4/1991 | Trytko ......................... | 358/183 |
| 5,196,922 A | * | 3/1993 | Yeomans .................... | 348/578 |
| 5,254,977 A | * | 10/1993 | MacDonald ................. | 345/150 |
| 5,264,944 A | * | 11/1993 | Takemura .................... | 358/335 |
| 5,384,912 A | * | 1/1995 | Ogrinc et al. ............... | 395/164 |
| 5,410,644 A | * | 4/1995 | Thier et al. .................. | 395/125 |
| 5,412,487 A | * | 5/1995 | Nishimura et al. .......... | 358/452 |
| 5,608,464 A | * | 3/1997 | Woodham .................... | 348/578 |
| 5,638,138 A | * | 6/1997 | Hickman ..................... | 348/678 |
| 6,020,932 A | | 2/2000 | Kurashige et al. | |
| 6,122,012 A | * | 9/2000 | Segman ....................... | 348/576 |
| 6,124,896 A | | 9/2000 | Kurashige | |
| 6,226,040 B1 | * | 5/2001 | Kuo et al. ................... | 348/446 |

* cited by examiner

*Primary Examiner*—Victor R. Kostak
(74) *Attorney, Agent, or Firm*—Frommer Lawrence & Haug LLP; William S. Frommer (57) ABSTRACT

A special effect image generating apparatus provided with an image conversion processing circuit for posterization or other image conversion, a luminance and chroma condition setting circuit for image extraction by luminance and colors, a mask pattern generator for selection of a mask, and mixer for preparing a video signal, a transformation unit for transformation processing such as movement, and a post video modification unit for addition of a locus etc. The extracted image automatically tracks movement of the image so there is no change in visual effects, images having the same luminance and color conditions can be deleted by mask adjustment, movement of the image can be handled by adjustment of the mask, and highly accurate boundaries can be set by the wave-filtering and shaping circuit. Therefore, a special effect image with distinctive luminance and color can be easily prepared.

12 Claims, 6 Drawing Sheets

Out = ( in - clip ) · gain
if (Out < 0 ) Out = 0
if (Out > 1.0 ) Out = 1.0

FIG.4B

Out = ( min - in ) · gain
if (Out < 0 ) Out = 0
if (Out > 1.0 ) Out = 1.0

ABS { ( In - center ) }

FIG.5C

Out = [ clip - ABS { ( In - center ) } ] · gain
if (Out < 0 ) Out = 0
if (Out > 1.0 ) Out = 1.0

SPECIAL EFFECT IMAGE GENERATING APPARATUS EMPLOYING SELECTIVE LUMINANCE/CHROMINANCE CONDITION SETTING

BACKGROUND OF THE INVENTION

1. Field of the Invention

The present invention relates to a special effect image generating apparatus for processing an image to generate a special effect.

2. Description of the Related Art

Processing original data for an image to give it a unique visual effect is a common practice in preparing television broadcast images and various other various. The types of image processing include "posterization" and "solarization" for reducing the number of gradients of the image data, "mosaic" processing for dividing an image to blocks of uniform densities, "mono" processing for making an image monochrome, "contrast" processing for adjusting the luminance difference of an image, and other various types of processing.

The special effect image generating apparatus of the related art performs the above variety of processing on an image as selected in an image conversion processing circuit. When doing this, it generates a mask pattern from a mask pattern generator to mask regions of the image not to be processed and used this mask pattern so as to process only predetermined regions of the image.

In the above special effect image generating apparatus of the related art, since predetermined positions of the image input to the apparatus were masked regardless of the state of the input image, when for example performing mosaic processing, the operator had to control the mask conditions to deal with any movement of the portions of the image to be masked accompanying movement of the input image. This adjusting operation required a lot of work.

SUMMARY OF THE INVENTION

An object of the present invention is to provide a special effect image generating apparatus capable of processing an input image based on luminance information and color information with a high accuracy while suitably handling even movement of the image and without imposing any burden on an operator in an adjusting operation so as to generate a special effect giving visually unique luminance and color effects.

To attain the above object, according to the present invention, there is provided a special effect image generation apparatus for processing an image to generate a special effect, comprising an image conversion means for performing predetermined image conversion on the image; an extraction condition setting means for extracting from the above image an image satisfying a plurality of extraction conditions among luminance extraction conditions based on a luminance signal and/or chroma extraction conditions based on at least a color signal; a key signal output means for outputting a key signal for setting extraction conditions for the image based on the luminance extraction conditions and/or the chroma extraction conditions; and a mixer circuit for processing the image to convert the image to a special effect image based on a signal of the image, an output signal of the image conversion means, and the key signal.

Preferably, the special effect image generation apparatus further comprises a mask pattern generation means for outputting a mask pattern for masking a region not to be processed in the image, and the key signal output means outputs a key signal to set the extraction conditions for the image based on the mask pattern in addition to the luminance extraction conditions and/or chroma extraction conditions.

Alternately, the special effect image generation apparatus further comprises an image conversion setting and processing means for selecting and setting a type of image conversion to be performed on the image and making the image conversion means perform the selected and set image conversion on the image; and the selection and setting of the type of image conversion in the image conversion setting and processing means and the setting of the luminance extraction conditions and/or chroma extraction conditions are freely and independently performed.

More preferably, the special effect image generation apparatus further comprises a mask pattern generation means for outputting a mask pattern to mask a region not to be processed in the image; the key signal output means outputs a key signal for setting the extraction conditions for the image based on the mask pattern in addition to the luminance extraction conditions and/or chroma extraction conditions; and the setting and adjustment of the mask pattern generated by the mask pattern generation means, the selection and setting of the type of image conversion in the image conversion setting and processing means, and the setting of the luminance extraction conditions and/or chroma extraction conditions are freely and independently performed.

Alternatively, the special effect image generation apparatus further comprises a wave-filtering and shaping means for filtering and shaping the output signal of the extraction condition setting means.

Preferably, the image conversion means reduces the number of gradients of data of the image.

Alternatively, the image conversion means divides the image into blocks of uniform density.

Preferably, the chroma extraction conditions are extraction conditions based on a luminance signal and color difference signal of the image.

Alternatively, the chroma extraction conditions are decided for a two-dimensional region of a color difference value defined by a color difference signal of blue and luminance and a color difference signal of red and luminance of the image.

More preferably, the chroma extraction conditions are decided for a three-dimensional region of a color difference value and a luminance value defined by a color difference of a two-dimensional region of the color difference signal and a luminance value at a predetermined position in the two-dimensional region.

Preferably, the extraction condition setting means extracts an image based on an NAM output of the luminance extraction conditions and/or the chroma extraction conditions.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, preferred embodiments of the present invention will be explained with reference to FIGS. 1 to 6.

Figure 1:
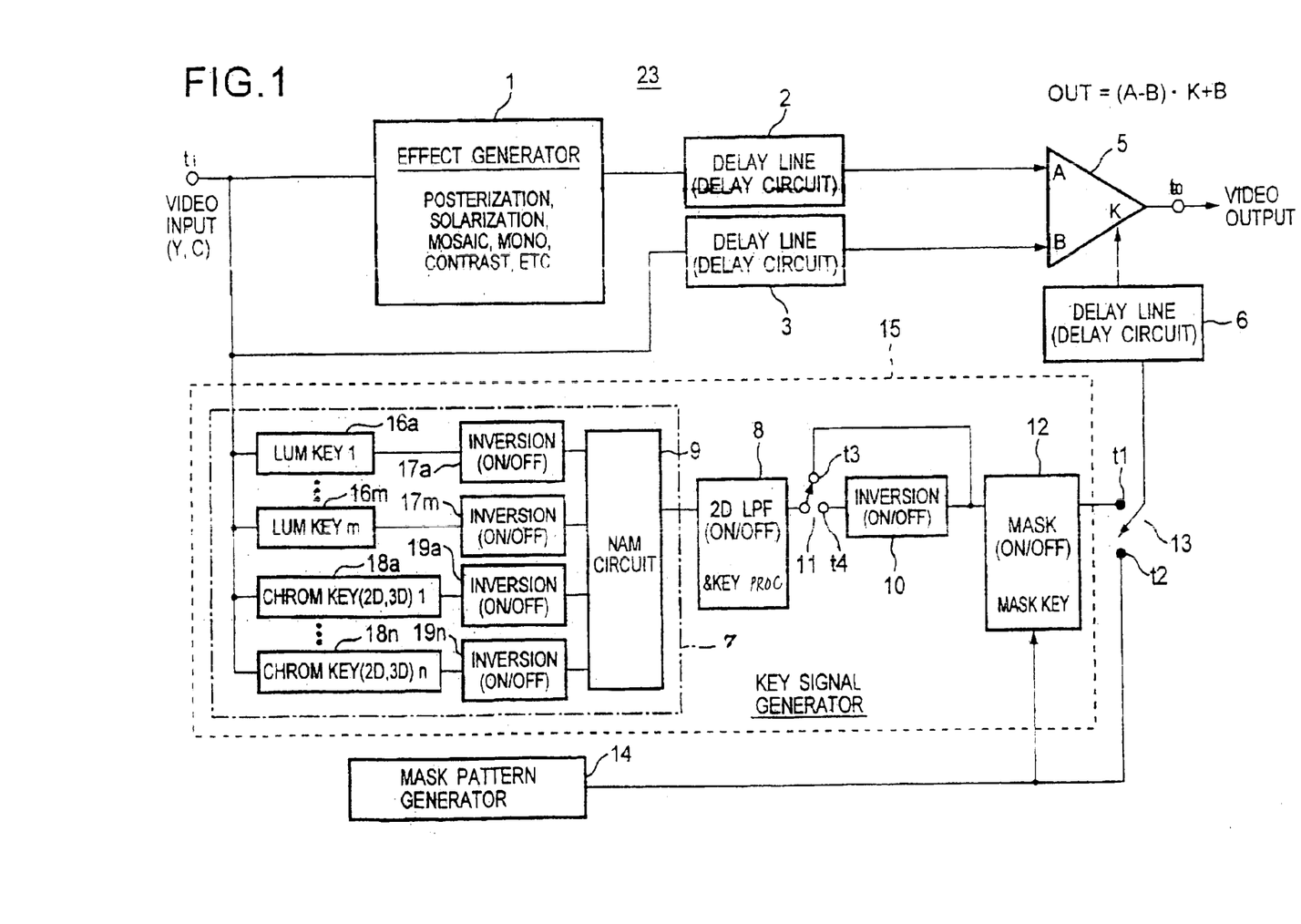
FIG. 1 is a block diagram of the configuration of a key portion of an embodiment of the present invention.
Figure 2:
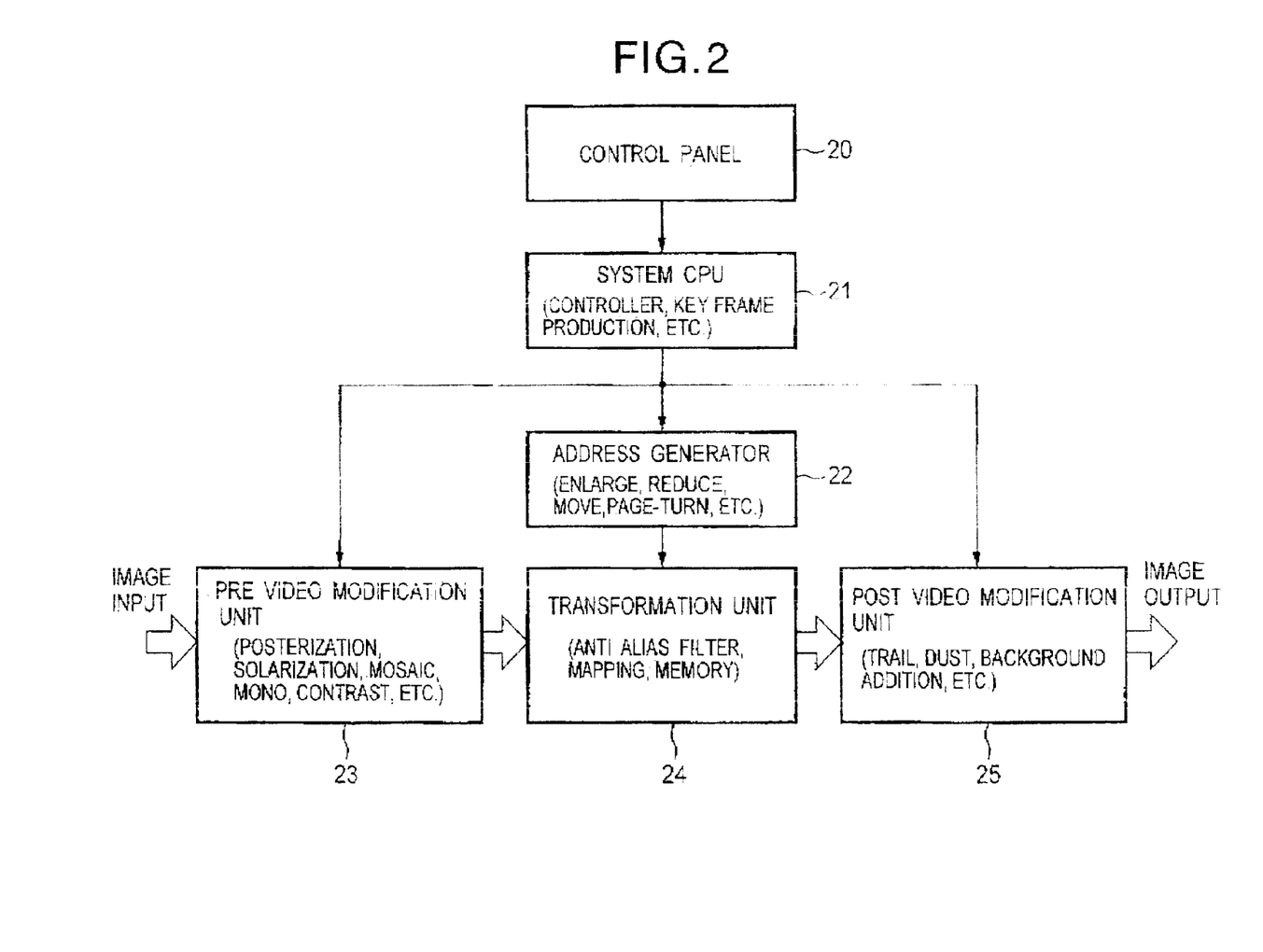
FIG. 2 is a block diagram of the overall configuration of an embodiment of the present invention.
Figure 3A:
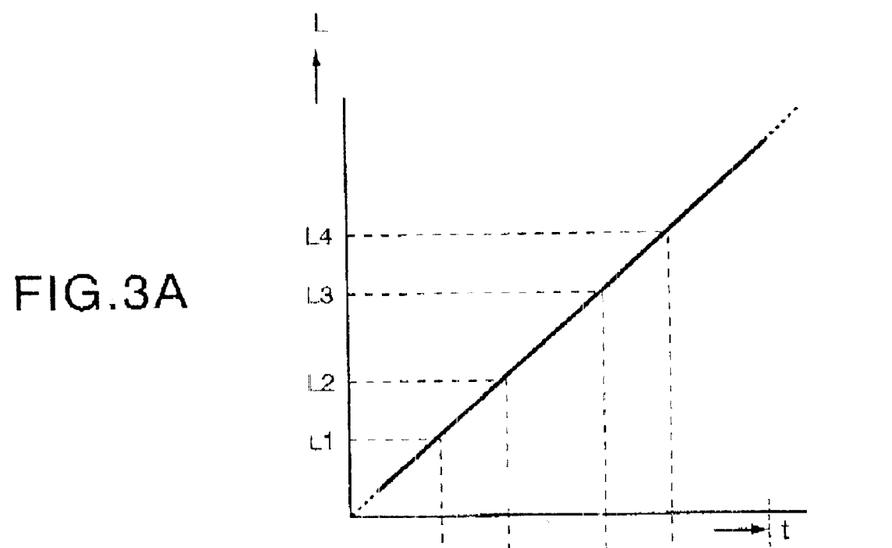
FIGS. 3A to 3D are views for explaining preparation of a key signal corresponding to the luminance of an input image of an embodiment of the present invention.
Figure 3B:
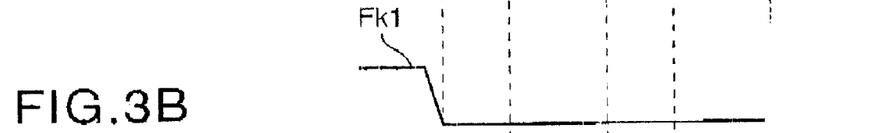
Figure 3C:
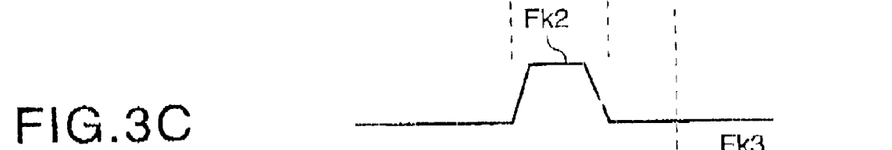
Figure 3D:
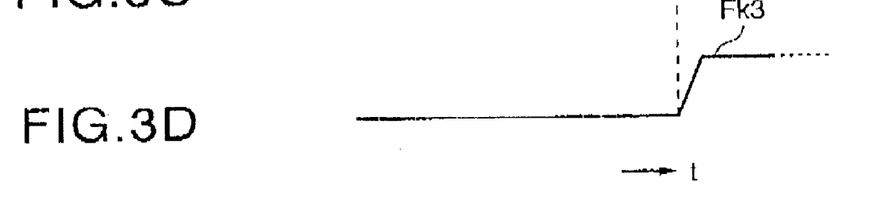
Figure 4A:
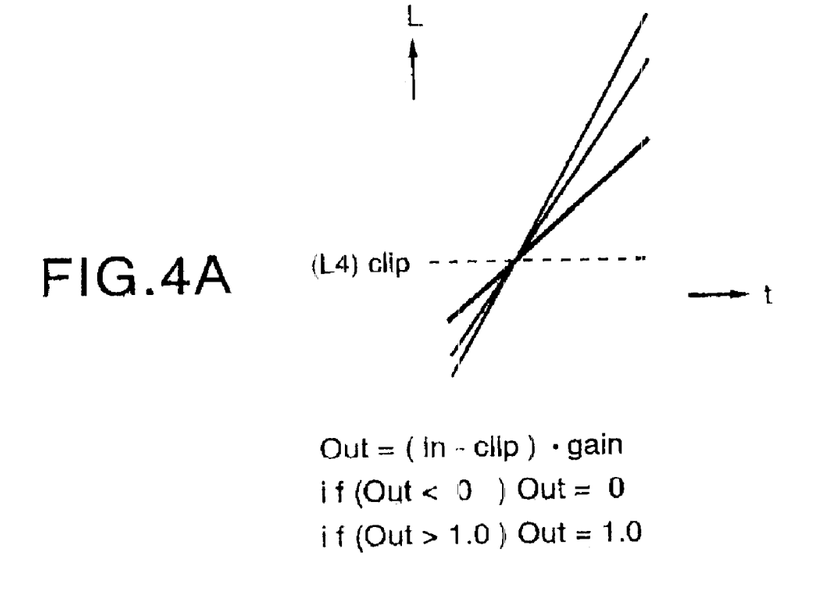
FIGS. 4A and 4B are views for explaining preparation of a key signal corresponding to regions having a reference luminance or more or a reference luminance or less in the input image of an embodiment of the present invention.
Figure 4B:
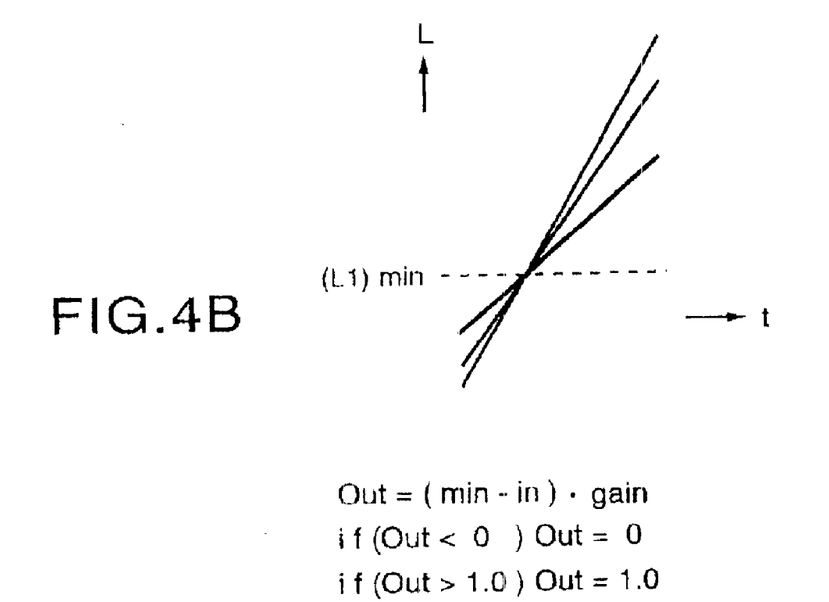
Figure 5A:
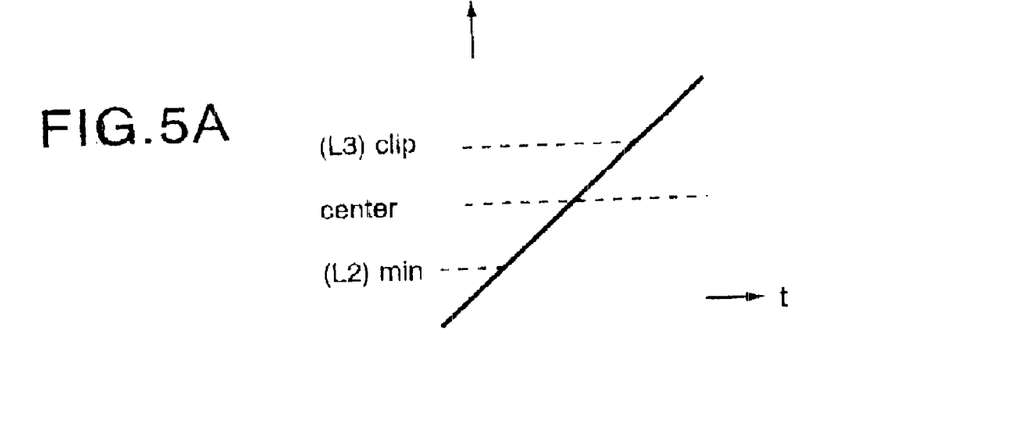
FIGS. 5A to 5C are views for explaining preparation of a key signal corresponding to a predetermined range of a luminance region of the input image of an embodiment of the present invention.
Figure 5B:
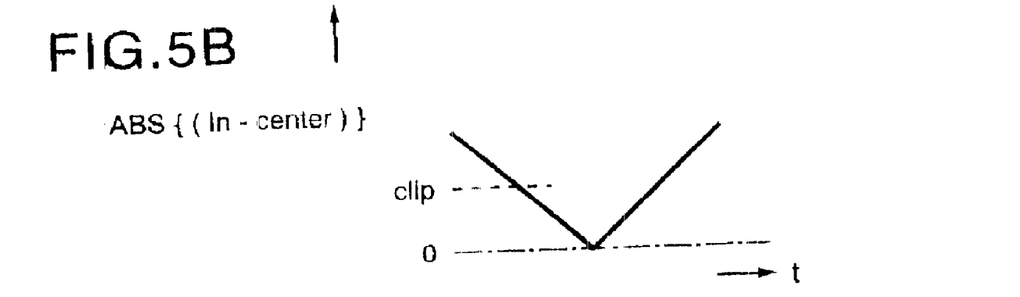
Figure 5C:
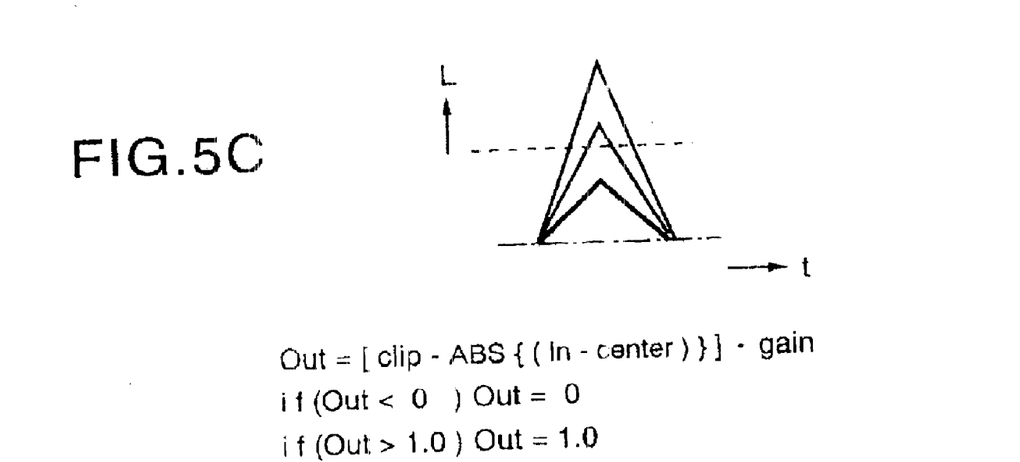
Figure 6A:
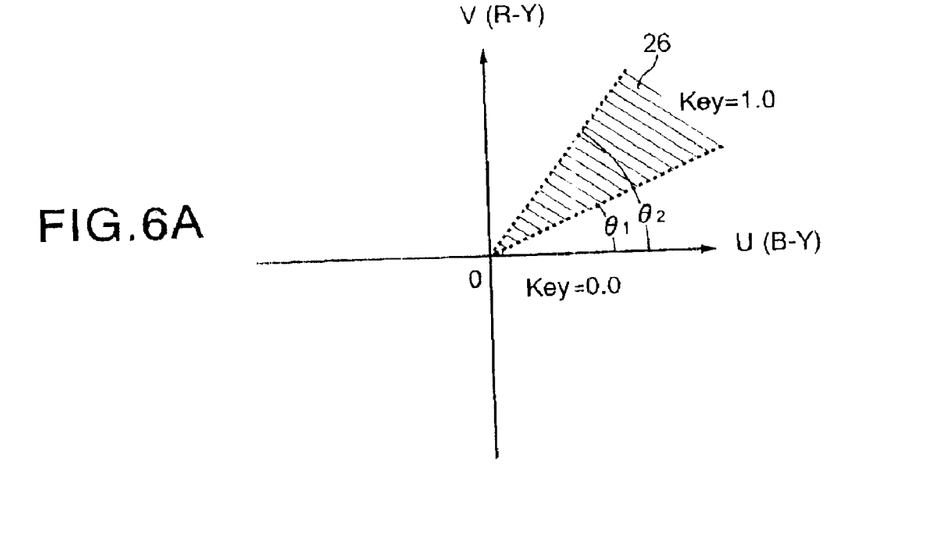
FIGS. 6A and 6B are views for explaining preparation of a key signal corresponding to a color signal of an input image of an embodiment of the present invention.
Figure 6B:
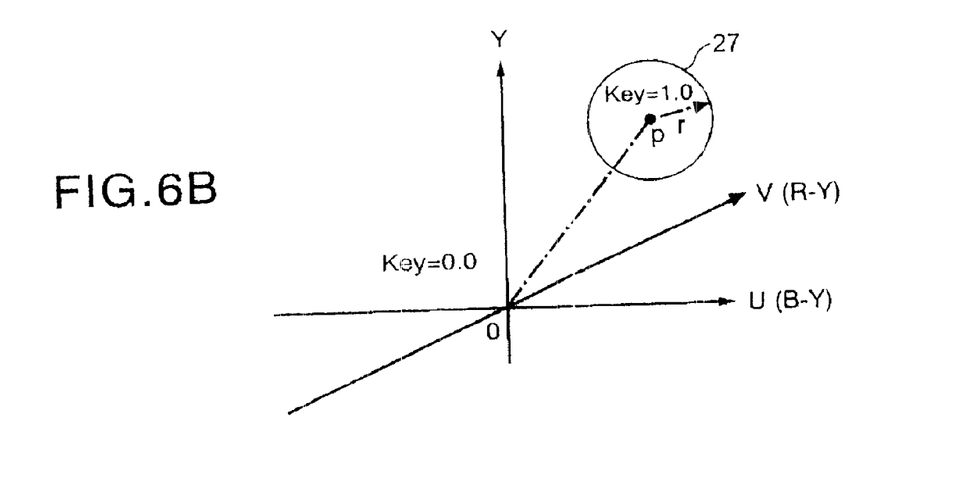

FIG. 1 is a block diagram of the configuration of a key portion of the present embodiment, FIG. 2 is a block diagram of the overall configuration of the present embodiment, FIGS. 3A to 3D are views for explaining preparation of a key signal corresponding to luminance of an input image of the present embodiment, FIGS. 4A and 4B are views for explaining preparation of a key signal corresponding to regions having a reference luminance or more or a reference luminance or less in the input image of the present embodiment, FIGS. 5A to 5C are views for explaining preparation of a key signal corresponding to a predetermined range of a luminance region of the input image of the present embodiment, and FIGS. 6A and 6B are views for explaining preparation of a key signal corresponding to a color signal of an input image of the present embodiment.

In the present embodiment, as shown in FIG. 2, a control panel 20 is provided to enable an operator to input a variety of operation signals, a system CPU 21 for controlling the overall operation is connected to the control panel 20, and a pre video modification unit 23 is connected to the system CPU 21. The pre video modification unit 23 comprises, as shown in FIG. 1, an image conversion processing circuit 1 for performing "posterization" for reducing the number of gradients of luminance data of an image, "solarization" for reducing the number of gradients on color data of the image, "mono" processing for making the image monochrome, "contrast" processing for adjusting luminance differences of the image, etc., a luminance and chroma condition setting circuit 7 for extracting an image satisfying luminance extraction conditions set in the image and chroma extraction conditions, and a mask pattern generator 14 for outputting a mask pattern for masking a region not to be processed in the image.

Also, the system CPU 21 is connected to an address generator 22 which outputs a corresponding address at the time of enlargement and/or reduction, movement, and page turning of the image. The address generator 22 is connected to a transformation unit 24 for performing the above enlargement and/or reduction. An input terminal of the transformation unit 24 is connected to an output terminal of the above pre video modification unit 23. Furthermore, the transformation unit 24 is provided with a mapping memory used in the enlargement and/or reduction and an anti-alias filter for removing jags generated at oblique lines in the image along with the enlargement and/or reduction.

Similarly, the system CPU 21 is connected to a post video modification unit 25. An input terminal of the post modification unit 25 is connected to an output terminal of the above transformation unit 24. The post video modification unit 25 has the functions of adding to an output signal of the transformation unit 24 a tail shaped moving locus or a star shaped moving locus at the time of moving an image and adding a background to an image according to a selecting operation by the operator.

The key portion of the pre video modification unit 32 of the present embodiment is configured as shown in FIG. 1 and comprises an image conversion processing circuit 1 for performing "posterization" for reducing the number of gradients on luminance data of an image, "solarization" for reducing the number of gradients on color data of the image, "mosaic" processing for dividing an image to blocks of uniform density, "mono" processing for making the image monochrome, "contrast" processing for adjusting luminance differences of the image, etc., a delay circuit 3 for delaying an input image signal, and a key signal generator 15 for outputting a key signal for processing the input image connected in parallel to an input terminal "ti". An output terminal of the image conversion processing circuit 1 is connected to the delay circuit 2, an output terminal of the delay circuit 2 is connected to a first input terminal of a mixer circuit 5, an output terminal of the delay circuit 3 is connected to a second input terminal of the mixer circuit 5, and an output terminal of the key signal generator 15 is connected to a third input terminal of the mixer circuit 5 via a switch 13 and a delay circuit 6. The mixer circuit 5 has a function of preparing a special effect image and outputting a corresponding special effect image signal based on an output signal of the delay circuit 2, an output signal of the delay circuit 3, and an output signal of the delay circuit 6.

The above key signal generator 15 is provided with a luminance and chroma condition setting circuit 7 for extracting and outputting an image portion corresponding to luminance and chroma conditions set by the operator based on the luminance and colors of the image from the input image. The input terminal ti of the image signal is connected to an input terminal of the luminance and chroma condition setting circuit 7. The luminance and chroma condition setting circuit 7 comprises a plurality of lumi-key setting circuits 16a to 16m set with extraction luminance conditions based on the luminance of the image and a plurality of chroma key setting circuits 18a to 18n set with extraction chroma conditions based on the luminance and colors connected in parallel to the input terminal "ti". The lumi-key setting circuits 16a to 16m are respectively connected to inversion circuits 17a to 17m, while the chroma key setting circuits 18a to 18n are respectively connected to inversion circuits 19a to 19n. When the levels of the input signals overlap, the output terminals of the inversion circuits 17a to 17m and 19a to 19n are connected to a NAM circuit 9 for selecting a signal of the higher level and outputting the same. An output terminal 9 of the NAM circuit 9 becomes an output terminal of the luminance and chroma condition setting circuit 7.

In the key signal generator 15, the output terminal of the luminance and chroma condition setting circuit 7 is connected to a wave-filtering and shaping circuit 8 for two-dimensional low pass filtering and signal shaping. The output terminal of the wave-filtering and shaping circuit 8 is connected to the inversion circuit 10 via a switch 11. Furthermore, an output terminal of the inversion circuit 10 is connected to a mask processing circuit 12, while the mask processing circuit 12 is connected to a mask pattern generator 14 for outputting a desired mask pattern signal by operation by the operator. The mask processing circuit 12 has a function of masking an output signal from the luminance and chroma condition setting circuit 7 to be processed in the wave-filtering and shaping circuit 8 by a mask pattern signal from the mask pattern generator 14. An output terminal of the mask processing circuit 12 is connected to a delay circuit 6 via a switch 13, while an output terminal of the delay circuit 6 is connected to the third input terminal of the mixer circuit 5.

The operation of the present embodiment configured in this way will be explained next. The operator inputs from the control panel 20 the instruction operation signal necessary for the processing of the image. The instruction operation signal includes an image conversion instruction for selecting image conversion processing of "posterization" for reducing the number of gradients in luminance data of an image of the image conversion processing circuit 1 of the pre video modification unit 23, "solarization" for reducing the number of gradients in color data of the image, "mosaic" processing for dividing an image into blocks of uniformed density, "mono" processing for making the image monochrome, "contrast" processing for adjusting luminance differences of the image, etc. Further, the instruction operation signal includes a luminance and chroma condition instruction of the luminance and chroma condition setting circuit 7 and a mask instruction for instructing a shape and position of a mask pattern to be generated by the mask pattern generator 14. Furthermore, the instruction operation signal input from the control panel 20 includes, if required, an image transformation instruction for enlarging, reducing, moving, and rotating a designated portion of an image by selection by the operator.

Here, the luminance and chroma condition instruction of the luminance and chroma condition setting circuit 7 entered by the operator will be explained. First, the setting of a lumi-key for deciding the extraction luminance conditions based on the luminance of the image will be explained. The extraction luminance conditions are set based on the luminance of the image in this case by the operator operating a level setting device provided on the control panel 20 and having a display panel displaying a luminance range (0 to 10) of the image.

FIG. 3A is a view of the relationship between a luminance level L of the input image signal of the image and time "t", wherein a key signal Fk3 shown in FIG. 3D is output as a key signal for extracting from the input image signal an image having a luminance level of a predetermined level L4 or more set in advance. In this case, as shown in FIG. 4A, an output level signal "Out" is found by multiplying an amplification constant "gain" with a difference of a luminance level signal "in" of the input image and an upper limit reference value "clip". A key signal Fk3 as shown in FIG. 3D can be obtained by a limiter circuit making the output level signal "Out" zero when "Out"<0 and making "Out" 1.0 when "Out">1.0.

Also, a key signal Fk1 shown in FIG. 3B is output as a key signal for extracting from the input image signal an image having a luminance level of a predetermined level L1 or less set in advance. In this case, as shown in FIG. 4B, an output level signal "Out is found by multiplying an amplification constant "gain" with a difference of a luminance level signal "in" of the input image and a lower limit reference value "min". A key signal Fk1 as shown in FIG. 3B can be obtained by a limiter circuit making the output level signal "Out" 0 when "Out"<0 and making "Out" 1.0 when "Out">1.0.

As a key signal for extracting from the input image signal an image of a luminance level of a predetermined level range (L2<L<L3) set in advance, a key signal Fk2 shown in FIG. 3C is output. In this case, a central value "center" of the upper limit value L3 (clip) and the lower limit value L2 (min) is obtained as shown in FIG. 5A. An absolute value "ABS" of the difference of the luminance level signal "in" of the input image and "center" is calculated as shown in FIG. 5B. Furthermore, as shown in FIG. 5C, the absolute value "ABS" of the difference of the luminance level signal "in" of the input image and "center" is subtracted from the "clip", and the output level signal "Out" is calculated by multiplying the subtracted value with the amplification constant "gain". A key signal Fk2 as shown in FIG. 3C can be obtained by the limiter circuit which makes the output level signal "Out" 0 when "Out"<0 and makes "Out" 1.0 when "Out">1.0.

Next, the setting of a chroma key for deciding the extraction chroma conditions based on colors or both luminance and colors of the image will be explained. When the control panel 20 is provided with a two-dimensional chroma key setting device for two-dimensionally setting a color signal region of an extracted signal on a two-axis plane comprised of a U-axis of the chromaticity signal (B-Y) and a V-axis of the chromaticity signal (R-Y) by an input of boundary angles from a reference chromaticity signal axis, the chroma key for deciding the extraction chroma conditions based on the colors or both luminance and colors of the image is set by an operator operating the two-dimensional chroma key setting device. When the control panel 20 is provided with a three-dimensional chroma key setting device for three-dimensionally setting a color signal region of the extracted signal on a two-axis plane comprised of a U-axis of the chromaticity signal (B-Y) and a V-axis of the chromaticity signal (R-Y) by an input of boundary angles from a reference chromaticity signal axis and furthermore the luminance Y of the color signal is also in accordance with a set distance from the reference position, the key is set by an operator operating the three-dimensional chroma key setting device.

When setting a color signal region of the extracted image from the two-dimensional chroma key setting device, by entering boundary angles θ1 and θ2 to the two-dimensional chroma key setting device, a boundary angle signal from the U-axis of the chromaticity signal (B-Y) is input on the two-axis plane comprised of the U-axis of the chromaticity signal (B-Y) and the V-axis of the chromaticity signal (R-Y) as shown in FIG. 6A and a color signal region 26 of the extracted image is selected two-dimensionally as shown in the shaded portion in FIG. 6A. The logic value of the chroma key signal becomes "1" in the color signal region 26, while becomes "0" in other regions. Also, when setting a color signal region of the extracted image from the three-dimensional chroma key setting device, by entering boundary angles in the same way as in the two-dimensional chroma key setting device and furthermore inputting the luminance Y of a color signal in accordance with the set distance from the reference position, a color signal region 27 of, for example, a sphere having a radius of "r" from a central point "P", is selected on the three-dimensional coordinates including the luminance Y as shown in FIG. 6B. The logic value of the chroma key signal becomes "1" in the color signal region 27 and becomes "0" in regions other than that.

Similarly, lumi-key signals output from the plurality of lumi-key setting circuits 16a to 16m set with extraction luminance conditions based on the luminance of the image and chroma key signals output from the plurality of chroma key setting circuits 18a to 18n set with extraction chroma conditions based on colors or both luminance and colors of the image are respectively input to the NAM circuit 9 via the inversion circuits 17a to 17m and 19a to 19n. When extraction conditions overlapping with the input signals are set by the NAM circuit 9, the one having the higher level is selected and output. An output signal of the luminance and chroma condition setting circuit 7 is input to the wave-filtering and shaping circuit 8 for two-dimensional low pass filtering and signal shaping, and then input to the mask processing circuit 12 via the switch 11, which is normally switched to the terminal "t3" side when used. The mask processing circuit 12 is receives by input by the operator a mask pattern signal from the mask pattern generator 14 for outputting a desired mask pattern signal. When the mask pattern signal is input, the output signal of the luminance and chroma condition setting circuit 7 processed in the wave-filtering and shaping circuit 8 is masked by the mask pattern signal. An output signal from the mask processing circuit 12 is input to the delay circuit 6 via the switch 13, which is normally switched to the terminal "t1" side when used.

On the other hand, for example, when image conversion processing of "posterization" for reducing the number of gradients of luminance data of the image and "solarization" for reducing the number of gradients of color data of the image are selected in the image conversion processing circuit 1 of the pre video modification unit 23 by an image conversion instruction in the instruction operation signal input from the control panel 20 by the operator, an image signal obtained by "posterization" and "solarization" of an input image signal from the input terminal "ti" is input to the delay circuit 2. At the same time, the input image signal from the input terminal "ti" is input to the delay circuit 3. Then, a delay of the output signal of the mask processing circuit 12 is adjusted in the delay circuit 6, a delay of the output signal of the image conversion processing circuit 1 is adjusted in the delay circuit 2, and a delay of the input image signal is adjusted in the delay circuit 3. In the state where phases of the above match, the output signal of the image conversion processing circuit 1 is input to the first input terminal of the mixer circuit 5, the input image signal is input to the second terminal of the mixer circuit 5, and the output signal of the mask processing signal 12 is input to the third input terminal of the mixer circuit 5.

The mixer circuit 5 designates a key signal output from the key signal generator 15 as "K", multiplies "K" with a difference signal of a conversion image signal "A" obtained by image conversion of the input image signal of the input terminal "ti" in the image conversion processing circuit 1 and an image signal "B" which is the input image signal after passing through the delay circuit 3. Then, the image signal "B" is added to the calculated value. As a result, the mixer circuit 5 outputs a video signal "Out" ((A−B)·K+B). As shown in FIG. 2, the video signal is input to the transformation unit 24 from the pre video modification unit 23, however, when an image conversion instruction for reducing and moving a designated portion in the image to be processed is included in the instruction operation signal input from the control panel by the operator, an address signal for reduction and movement is supplied to the transformation unit 24 from the address generator 22 by an instruction signal from the system CPU 21. The transformation unit 24 performs processing for reduction and movement of the designated portion in the image. When jags etc. are generated at oblique line portions in the image, the jags are removed by the anti-alias filter. The processed image signal is then input to the post video modification unit 25.

In this case, when addition of a tail shaped moving locus or a star shaped moving locus or addition of background at the time of moving an image is selected for the output signal of the transformation unit 24 by a selecting operation by the operator, a tail shaped moving locus or a star shaped moving locus or a background is added in the post video modification unit 25. The special effect image finally obtained by the image processing is output from the post video modification unit 25.

As explained above, according to the present embodiment, image conversion processing of "posterization" and "solarization" for reducing the number of gradients of the image data, "mosaic" processing for dividing the image to blocks of uniform density, "mono" processing for making the image monochrome, or "contrast" processing for adjusting the luminance differences of the image is selected in the image conversion processing circuit 1 by a selection operation by the operator. Extraction luminance conditions based on the luminance of the image and extraction chroma conditions based on the colors or both luminance and colors of the image are set. A shape and position of the mask pattern generated from the mask pattern generator 14 are selected in the luminance and chroma condition setting circuit 7. Then, the mixer circuit 5 processes a selected part of the image.

For a video signal, the transformation unit 24 performs various processing such as reduction and movement and removes the jags generated along with the processing. The post video modification unit 25 adds a tail shaped moving locus or a star shaped moving locus or adds a background to the image in accordance with need. Therefore, it is possible to give a visually unique effect in terms of luminance and colors to an image by an easy operation. Also, according to the present embodiment, even if the image moves, the image portion extracted by the set luminance and chroma conditions automatically moves in accordance with the movement of the image. Therefore, it is possible to prevent changes generated in the visual effects of the special effect image. Furthermore, it is possible to process only part of a plurality of image parts having the same luminance and chroma conditions, for example, only one of two face images on a display screen, by easily adjusting the mask pattern from the mask pattern generator 14 to obtain a mask having a minimum area extending over a wide range.

Furthermore, it is possible to swiftly track movement and changes of the mask portion caused by movement of the image over a wide area with a high accuracy. Further, since the boundary region of the output signal from the luminance and chroma condition setting circuit 7 is broadened by the wave-filtering and shaping circuit 8 and the mask pattern from the mask pattern generator 14 is adjusted at a high accuracy, a portion desired to be processed can be completely covered when processing. For example, by broadening the boundary, it is possible to prevent incomplete mosaic processing, for example, leaving part of the face as it is when trying to give a mosaic effect to completely cover the face. By keeping the area of the mask portion to a minimum, it becomes possible to easily prepare a special effect image giving a clear and visually impressive effect excelling in luminance and color to a required region.

As explained above, the special effect image generation apparatus of the present embodiment comprises an image conversion means for performing predetermined image conversion on the image; an extraction condition setting means for extracting from the above image an image satisfying a plurality of extraction conditions among luminance extraction conditions based on a luminance signal and/or chroma extraction conditions based on at least a color signal; a key signal output means for outputting a key signal for setting extraction conditions for the image based on the luminance extraction conditions and/or the chroma extraction conditions; and a mixer circuit for processing the image to convert the image to a special effect image based on a signal of the image, an output signal of the image conversion means, and the key signal.

More specifically, it further comprises a mask pattern generation means for outputting a mask pattern for masking a region not to be processed in the image and an image conversion setting and processing means for selecting and setting a type of image conversion to be performed on the image and making the image conversion means perform the selected and set image conversion on the image.

According to the above embodiment, the image conversion setting and processing means selects and sets a type of image conversion to be performed on the image and performs the image conversion to the selected and set image, the extraction condition setting means sets luminance extraction conditions based on a luminance signal and chroma extraction conditions based on the luminance signal and color signals for the image, the region not to be processed in the image is masked by the mask pattern output from the mask pattern generation means, and a key signal of a portion to be extracted in the image which satisfies the predetermined luminance and chroma extraction conditions is output. Then, based the image signal, the output signal of the image conversion and setting processing means, and the key signal, the mixer circuit processes the image for the selected image conversion and extraction of image parts based on the predetermined luminance and chroma extraction conditions. Due to this, a predetermined image part in the image is extracted by distinctive luminance and chroma conditions and is converted to a special effect image.

As a result, it is possible to give a special effect to a predetermined part in an image and easily generate a high quality special effect image having a distinctive visual effect in luminance and colors can be easily generated. Furthermore, since the portion extracted from the image based on the predetermined luminance and chroma extraction conditions moves following movement of the image, changes of visual effects of an image caused by movement of the image can be prevented.

In the special effect image generation apparatus of the present embodiment, the selection and setting of the type of image conversion in the image conversion setting and processing means, the setting of the luminance extraction conditions and/or chroma extraction conditions, and the setting and adjustment of a mask pattern generated by the mask pattern generation means can be freely and independently performed by the operator in accordance with the special effect image desired. As a result, the operator can accurately generate a special effect image of the desired high quality, and it becomes possible to suitably handle movement of the image by an easy operation of adjustment of the mask pattern.

Further, the special effect image generation apparatus of the present embodiment may be provided with a wave-filtering shaping means for filtering and shaping the output signal of the extraction condition setting means so as to broaden the luminance and chroma extraction region. Therefore, a high quality special effect image wherein boundary lines are smoothly set can be generated.

While the invention has been described with reference to specific embodiment chosen for purpose of illustration, it should be apparent that numerous modification could be made thereto by those skilled in the art without departing from the basic concept and scope of the invention.

What is claimed is:

1. A special effect image generation apparatus for processing an image signal (B) to generate a special effect, comprising:

extraction condition setting means for setting luminance and/or chrominance extraction conditions to be applied to the image signal to extract various portions thereof, said extraction conditions being selected by an operator;

image conversion means for performing predetermined image conversion of said image signal to form a conversion signal (A);

key signal output means for generating and outputting a key signal (K) according to the set extraction conditions; and a mixing circuit for receiving said key signal, said image signal, and said conversion image signal and for generating a converted image signal therefrom in accordance with the following relationship:

converted image signal=$(A-B) \cdot K+B$.

2. A special effect image generation apparatus as set forth in claim 1, further comprising a mask pattern generation means for outputting a mask pattern for masking a region not to be processed in said image; and wherein said key signal output means outputs a key signal to set said extraction conditions for said image based on said mask pattern in addition to said luminance extraction conditions and/or chroma extraction conditions.

3. A special effect image generation apparatus as set forth in claim 1, further comprising an image conversion setting and processing means for selecting and setting a type of image conversion to be performed on the image and making the image conversion means perform the selected and set image conversion on said image; and wherein the selection and setting of the type of image conversion in said image conversion setting and processing means and the setting of said luminance extraction conditions and/or chroma extraction conditions are freely and independently performed.

4. A special effect image generation apparatus as set forth in claim 3, further comprising a mask pattern generation means for outputting a mask pattern to mask a region not to be processed in said image; and wherein said key signal output means outputs a key signal for setting said extraction conditions for said image based on said mask pattern in addition to said luminance extraction conditions and/or chroma extraction conditions; and the setting and adjustment of the mask pattern generated by said mask pattern generation means, the selection and setting of the type of image conversion in said image conversion setting and processing means, and the setting of said luminance extraction conditions and/or chroma extraction conditions are freely and independently performed.

5. A special effect image generation apparatus as set forth in claim 1, further comprising a wave-filtering and shaping means for filtering and shaping the output signal of said extraction condition setting means.

6. A special effect image generation apparatus as set forth in claim 1, wherein said image conversion means reduces the number of gradients of data of said image.

7. A special effect image generation apparatus as set forth in claim 1, wherein said image conversion means divides said image into blocks of uniform density.

8. A special effect image generation apparatus as set forth in claim 1, wherein said chroma extraction conditions are extraction conditions based on a luminance signal and color difference signal of said image.

9. A special effect image generation apparatus as set forth in claim 1, wherein said chroma extraction conditions are decided for a two-dimensional region of a color difference value defined by a color difference signal of blue and luminance and a color difference signal of red and luminance of said image.

10. A special effect image generation apparatus as set forth in claim 8, wherein said chroma extraction conditions are decided for a three-dimensional region of a color difference value and a luminance value defined by a color difference of a two-dimensional region of said color difference signal and a luminance value at a predetermined position in said two-dimensional region.

11. A special effect image generation apparatus as set forth in claim 1, wherein said extraction condition setting means extracts an image based on a NAM output of said luminance extraction conditions and/or said chroma extraction conditions.

12. The apparatus as set forth in claim 1, wherein said extraction condition setting means further includes extraction means for extracting a plurality of luminance and/or chrominance conditions present in said image signal for selection by the operator.

* * * * *